W. B. GODDARD.
FLY CATCHER.
APPLICATION FILED NOV. 4, 1915.
1,196,353. Patented Aug. 29, 1916.
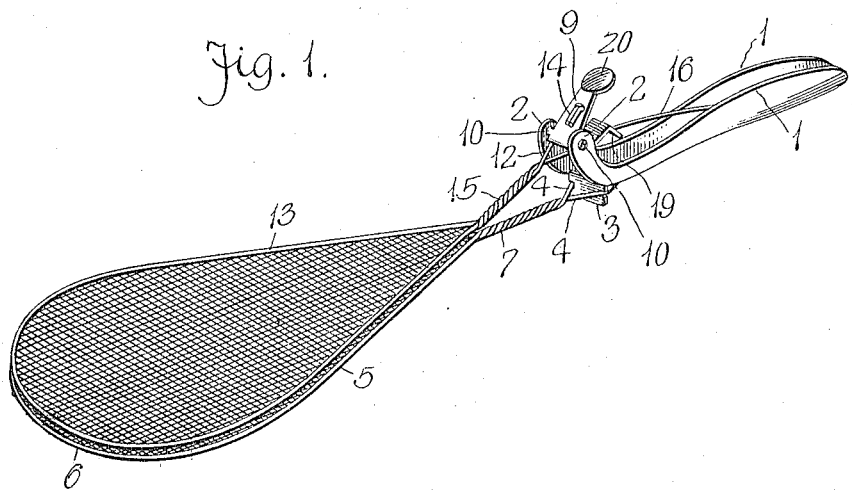
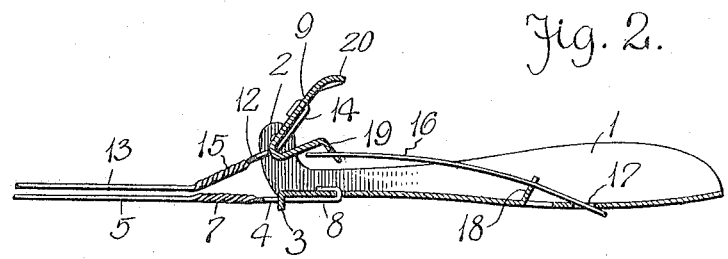
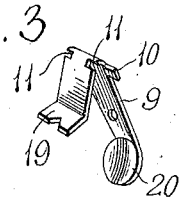
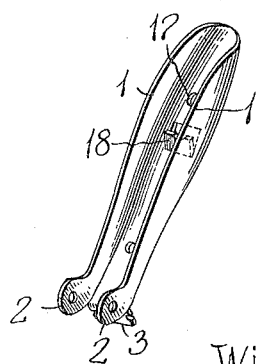
Witnesses
Chas. W. Stauffiger
Anna M. Dorr.
Inventor
Wilfred B. Goddard.
By
Attorneys

UNITED STATES PATENT OFFICE.

WILFRED B. GODDARD, OF DETROIT, MICHIGAN.

FLY-CATCHER.

1,196,353.

Specification of Letters Patent.

Patented Aug. 29, 1916.

Application filed November 4, 1915. Serial No. 59,506.

*To all whom it may concern:*

Be it known that I, WILFRED B. GODDARD, citizen of the United States of America, residing at Detroit, in the county of Wayne and State of Michigan, have invented certain new and useful Improvements in Fly-Catchers, of which the following is a specification, reference being had therein to the accompanying drawings.

This invention relates to a fly catcher and to an arrangement thereof whereby the implement may be used in the ordinary way as a fly swatter, or to entrap and crush flies that are on hanging draperies, bric-a-brac or other articles where they cannot be molested as by a swatter without injury to the articles on which they are perched.

The invention consists in the matters hereinafter set forth and more particularly pointed out in the appended claims.

In the drawings, Figure 1 is a view in perspective of a fly catcher that embodies features of the invention; Fig. 2 is an enlarged view in longitudinal section through the handle and pivotal connections thereof; Fig. 3 is a view in detail of a thumb plate, and Fig. 4 is a view in detail of the handle.

As shown herein, a handle is formed of sheet metal plate bent to have smoothly rounded marginal portions 1 that with the body form a good hand grip. A pair of pivot ears 2 extend in spaced relation from the forward end of the handle while a tongue struck out between them is downbent as a cross flange 3 having marginal notches that are adapted to receive and interlock with the divergent shank arms 4 of a fixed beater frame 5. The latter is formed of a wire bent into an obovate body loop 6 with twisted portions forming a shank 7 that is spread into a diamond, to embrace the flange 3, the end portions being brought into parallel relation and inbent as indicated at 8 to pass through an aperture in the handle whereby the beater forms a rigid extension thereof. The frame is covered with wire netting or suitable reticulate material. A thumb plate that consists of a metal strip 9 has a pair of oppositely extending pintles 10 that engage in pivotal apertures of the ears 2 and may be headed slightly on the outside to obviate accidental spreading of the ears. The plate is bent back on itself beyond the pintles and is provided with a pair of marginal notches 11 that engage the spread arms 12 of the diamond formed in the twisted shank of a swinging frame having an ovate body 13 that corresponds and registers with the loop portion 6 of the fixed member 5. The inner end portions 14 of the pivoted frame pass through an opening in the thumb piece 9 and are clenched down to hold the parts rigidly together, the twisted shanks 15 of the frame being bent and the arms 12 being likewise angled so that when the parts are in the position shown in Fig. 2, the beater and the pivot frame lie closely together. The two frame members are similar in all respects to reduce the cost of manufacture.

A round spring wire or rod 16 passes through an opening 17 of the handle and over an upstruck indented tongue 18 thereof and engages under the notched inbent and downturned end portion 19 of the finger piece 9 whereby the tension of the spring normally holds the parts as shown in Figs. 1 and 2.

In operation the implement is grasped with the thumb on the thumb piece 9, the end portion 20 of the latter being formed to conveniently fit the ball of the thumb, and the implement can be used as an ordinary fly swatter. By holding the jaws apart by pressing on the thumb piece 9 and then allowing them to snap together by slipping the thumb back and releasing the thumb piece, a fly is readily trapped between them.

Obviously, changes in the details of construction may be made without departing from the spirit of my invention, and I do not care to limit myself to any particular form or arrangement of parts.

What I claim is:—

1. A fly catcher comprising a handle of sheet material molded to form a hand grip for the major portion of its length and provided on the inner end with downturned spaced pivot ears, a beater frame rigidly secured to the eared end portion of the handle to extend therefrom in substantially the same plane, a sheet metal thumb piece bent between its ends and provided near the bend with pintles engaging perforations of the ears, a swinging frame corresponding in contour to the beater frame secured to the thumb piece to swing therewith, and a spring member housed within the handle and bearing outwardly against the thumb piece to normally hold the frames in contact.

2. A fly catcher comprising a handle formed of sheet metal molded as a hollow hand grip for the major portion of its length and provided with spaced pivot ears at one end, a transverse tongue struck out of the body of the metal between the ears and bent oppositely thereto, a thumb plate bent between its ends and provided near the bend with lateral pintles engaging pivot openings of the ears between which the thumb plate swings, a fixed frame formed of a wire bent into a loop with a twisted shank, the strands of which are separated to embrace the notched margins of the handle tongue and are passed through an opening in the handle and clenched against the latter, a beater frame of corresponding form to the fixed frame having a twisted shank with spread strands interlocking with the thumb plate and engaging at the outer contiguous end portions in an aperture of the thumb plate, and a spring bar secured to and housed within the hollow grip portion of the handle to bear outwardly against the inner arm of the thumb piece and to normally hold the beater frame and thumb piece frame in contact.

3. A fly catcher comprising a handle formed of sheet metal and provided with a pair of spaced and perforated pivot ears near one end and an oppositely extending tongue provided with notched margins, a beater frame having a body covered with reticulate material and a shank of twisted strands that are spread to form a diamond loop embracing the tongue and interlocking with notched margins thereof, the inner end portions of the strands being passed through and clenched to an aperture of the handle, a thumb piece bent between its ends and provided with pintles engaging in the perforations of the ears, a spring member passing through an opening in the body of the handle and over an instruck tongue formed between the marginal portions of the handle and bearing outwardly against the inner arms of the thumb member, and a swinging frame secured to the thumb member to bear against the beater frame.

In testimony whereof I affix my signature in presence of two witnesses.

WILFRED B. GODDARD.

Witnesses:
ANNA M. DORR,
CHARLES W. STAUFFIGER.

Copies of this patent may be obtained for five cents each, by addressing the "Commissioner of Patents, Washington, D. C."